(12) United States Patent
Matthews et al.

(10) Patent No.: US 10,860,122 B2
(45) Date of Patent: *Dec. 8, 2020

(54) SYSTEM AND METHOD FOR OBJECTIVELY MEASURING USER EXPERIENCE OF TOUCH SCREEN BASED DEVICES

(71) Applicant: Apkudo, Inc., Baltimore, MD (US)

(72) Inventors: Joshua Scott Matthews, Baltimore, MD (US); David Michael Teitelbaum, Havre de Grace, MD (US); Benjamin Kou-An Tseng, New South Wales (AU)

(73) Assignee: Apkudo, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,492

(22) Filed: Apr. 8, 2019

(65) Prior Publication Data
US 2019/0235655 A1 Aug. 1, 2019

Related U.S. Application Data

(63) Continuation of application No. 13/692,154, filed on Dec. 3, 2012, now Pat. No. 10,261,611.

(51) Int. Cl.
*G06F 3/041* (2006.01)
*G06F 11/22* (2006.01)
(Continued)

(52) U.S. Cl.
CPC .......... *G06F 3/041* (2013.01); *G06F 11/2221* (2013.01); *G06F 11/3041* (2013.01); *G06F 11/3419* (2013.01); *Y10S 901/14* (2013.01)

(58) Field of Classification Search
None
See application file for complete search history.

(56) References Cited

U.S. PATENT DOCUMENTS 6,044,398 A 3/2000 Marullo et al.
6,618,045 B1 9/2003 Lin
(Continued)

FOREIGN PATENT DOCUMENTS

CN 102110053 A 6/2011
CN 102141960 A 8/2011
(Continued)

OTHER PUBLICATIONS

"Monkeyrunner", A Simple monkeyrunner Program, The monkeyrunner API, Running monkeyrunner, monkeyrunner Built-in Help, and Extending monkeyrunner with Plugins, [no date], 6 pages.
(Continued)

*Primary Examiner* — Benjamin X Casarez
(74) *Attorney, Agent, or Firm* — Pillsbury Winthrop Shaw Pittman LLP

(57) ABSTRACT

In certain embodiments, latency measurement related to touch screen response may be facilitated. In some embodiments, a robotic member may be moved to perform a physical contact with a touch screen of a device. Frame change rates of the touch screen may be monitored. A response end time of a response depicted on the touch screen may be determined based on the monitored frame change rates of the touch screen, where the touch-screen-depicted response is a response to. A latency of the touch screen response to the first contact may be determined based on a contact time of the physical contact and the response end time.

20 Claims, 5 Drawing Sheets

(51) Int. Cl.
*G06F 11/34* (2006.01)
*G06F 11/30* (2006.01)

(56) References Cited

U.S. PATENT DOCUMENTS

| | | | |
|---|---|---|---|
| 6,745,385 B1 | 6/2004 | Lupu et al. | |
| 7,343,390 B2 | 3/2008 | Cohen et al. | |
| 7,388,977 B2 | 6/2008 | Wang et al. | |
| 7,483,984 B1 | 1/2009 | Jonker et al. | |
| 7,769,009 B1 | 8/2010 | Catzer et al. | |
| 8,271,608 B2 | 9/2012 | Mahaffey et al. | |
| 8,296,445 B1 | 10/2012 | Hackborn et al. | |
| 8,971,821 B2 | 3/2015 | Schlub et al. | |
| 9,075,781 B2 | 7/2015 | Matthews et al. | |
| 10,261,611 B2 * | 4/2019 | Matthews | G06F 11/3041 |
| 2003/0145317 A1 | 7/2003 | Chamberlain | |
| 2004/0261248 A1 | 12/2004 | Hwang | |
| 2006/0038581 A1 | 2/2006 | Kanai | |
| 2006/0139269 A1 | 6/2006 | Takeshita et al. | |
| 2006/0174162 A1 | 8/2006 | Varadarajan et al. | |
| 2007/0186250 A1 | 8/2007 | Carey | |
| 2007/0205751 A1 | 9/2007 | Suzuki et al. | |
| 2007/0256114 A1 | 11/2007 | Johnson et al. | |
| 2008/0013825 A1 | 1/2008 | Nagatsuka et al. | |
| 2008/0274716 A1 | 11/2008 | Fok et al. | |
| 2008/0316217 A1 | 12/2008 | Khan | |
| 2008/0316368 A1 | 12/2008 | Fritsch et al. | |
| 2009/0007074 A1 | 1/2009 | Campion et al. | |
| 2009/0031015 A1 | 1/2009 | Morgan et al. | |
| 2009/0124250 A1 | 5/2009 | Topaltzas et al. | |
| 2009/0138579 A1 | 5/2009 | Jung | |
| 2009/0203368 A1 | 8/2009 | Marsyla et al. | |
| 2009/0249301 A1 | 10/2009 | Kalla et al. | |
| 2009/0265035 A1 | 10/2009 | Jenkinson et al. | |
| 2009/0307531 A1 | 12/2009 | Karthikeyan et al. | |
| 2009/0312009 A1 | 12/2009 | Fishel | |
| 2010/0080143 A1 | 4/2010 | Topaltzas et al. | |
| 2010/0088423 A1 | 4/2010 | Mazzagatte et al. | |
| 2010/0198402 A1 | 8/2010 | Greer et al. | |
| 2010/0231738 A1 | 9/2010 | Border et al. | |
| 2011/0080940 A1 | 4/2011 | Bocharov et al. | |
| 2011/0087924 A1 | 4/2011 | Kandula et al. | |
| 2011/0113287 A1 | 5/2011 | Gururaj | |
| 2011/0263243 A1 | 10/2011 | Topaltzas et al. | |
| 2011/0288964 A1 | 11/2011 | Linder et al. | |
| 2011/0296009 A1 | 12/2011 | Baranov et al. | |
| 2011/0302454 A1 | 12/2011 | Prophete et al. | |
| 2011/0304634 A1 | 12/2011 | Urbach | |
| 2011/0310041 A1 | 12/2011 | Williams et al. | |
| 2011/0320879 A1 | 12/2011 | Singh et al. | |
| 2012/0015723 A1 | 1/2012 | Lai | |
| 2012/0070090 A1 | 3/2012 | Chang et al. | |
| 2012/0146956 A1 | 6/2012 | Jenkinson | |
| 2012/0155292 A1 | 6/2012 | Zazula et al. | |
| 2012/0188176 A1 | 7/2012 | Uzelac et al. | |
| 2012/0191394 A1 | 7/2012 | Uzelac et al. | |
| 2012/0198279 A1 | 8/2012 | Schroeder | |
| 2012/0210242 A1 | 8/2012 | Burckart et al. | |
| 2012/0221570 A1 | 8/2012 | Kalavade | |
| 2012/0221893 A1 | 8/2012 | Bai et al. | |
| 2012/0231785 A1 | 9/2012 | Poon et al. | |
| 2012/0245918 A1 | 9/2012 | Overton et al. | |
| 2012/0246515 A1 | 9/2012 | Lusenhop et al. | |
| 2012/0254917 A1 | 10/2012 | Burkitt et al. | |
| 2012/0266142 A1 | 10/2012 | Bokhari | |
| 2012/0280934 A1 | 11/2012 | Ha et al. | |
| 2012/0311569 A1 | 12/2012 | Shah | |
| 2013/0002862 A1 | 1/2013 | Waring et al. | |
| 2013/0132616 A1 | 5/2013 | Worthington et al. | |
| 2013/0194195 A1 * | 8/2013 | Parekh | G06F 3/0416 345/173 |
| 2013/0197862 A1 | 8/2013 | Uzelac et al. | |
| 2013/0200917 A1 | 8/2013 | Panagas | |
| 2013/0227348 A1 | 8/2013 | Stephenson et al. | |
| 2014/0156783 A1 | 6/2014 | Matthews et al. | |
| 2014/0281714 A1 | 9/2014 | Matthews et al. | |
| 2015/0029107 A1 | 1/2015 | Kuznetsov | |

FOREIGN PATENT DOCUMENTS

| | | |
|---|---|---|
| EP | 2369481 | 9/2011 |
| EP | 2492814 | 8/2012 |
| EP | 2515526 | 10/2012 |
| JP | 2008-244688 | 10/2008 |
| WO | 2011/128514 | 10/2011 |
| WO | 2014/150306 | 9/2014 |

OTHER PUBLICATIONS

"Testdroid Recorder 2.0.9", Testing, Tools, Application Development Frameworks, and Mobile and Device Development, [no date], 3 pages.

Optofidelity Touch Panel Performance Test systems Brochure, dated Aug. 2013 available at http://www.optofidelity.com/wp-content/uploads/2013/09/OF_TPPT_general.pdf, 4 pages.

Optofidelity Test Automation Product Portfolio Brochure, dated May 2014 available at http://www.optofidelity.com/wp-content/uploads/2014/07/OF_ProductPortfolio_2014_En.pdf, 6 pages.

Video of Optofidelity Touch Panel Performance Tester, dated Oct. 15, 2012 available at https://www.youtube.com/watch?v=q_sxn1hZu78, 1 page.

Optofidelity Watchdog Brochure, dated Oct. 2013 available at http://www.optofidelity.com/wp-content/uploads/2013/11/OF_WatchDog_EN_www.pdf, 2 pages.

Optofidelity Measurement Services Brochure, dated Q1 2013 available at http://www.optofidelity.com/wp-content/uploads/2013/09/OF_MeasurementReport.pdf, 10 pages.

* cited by examiner

SYSTEM AND METHOD FOR OBJECTIVELY MEASURING USER EXPERIENCE OF TOUCH SCREEN BASED DEVICES

CROSS-REFERENCE TO RELATED APPLICATIONS

This application is a continuation of U.S. application Ser. No. 13/692,154, filed Dec. 3, 2012, which is hereby incorporated by reference herein in its entirety.

FIELD OF THE INVENTION

The invention relates generally to a system and method for objectively measuring user experience of touch screen based devices via external mechanisms.

BACKGROUND OF THE INVENTION

User input and interaction with mobile and embedded devices typically occurs, for example, via a touch screen display on a device. A display response rate for a display (e.g., a touch screen found on devices such as a phone, tablet, and/or other mobile or embedded devices) may be a latency between a typical user action (e.g., touch, swipe, button press, and/or other contact with the touch screen) and a resulting reaction appearing on the device's display.

Conventionally, display response rate may be hard to accurately determine. In some examples, display response rate may be determined by metrics maintained on the device whose rate is being measured. In other examples, display response rate may be determined by monitoring human interaction with the device, which may introduce error or inaccuracy, as the human interaction may not be consistently identical and repeatable without variation.

Conventional systems for measuring display response rate of touch screen devices suffer from these and other drawbacks.

SUMMARY OF THE INVENTION

The invention addressing these and other drawbacks relates to a system and method for measuring latency of display response of a touch screen on a touch screen based device.

In some embodiments, the objective measurement of a user experience of touch screen based devices may be carried out by external mechanisms. In some embodiments, a robotic member (e.g., a robotic finger, a pointer, and/or other type of robotic member) may interact with a touch screen device by contacting the touch screen, and a video camera may record both the contact between the robotic member and the touch screen, and the response of the touch screen device. A latency of the touch screen response may be calculated by analyzing the recording from the video camera. In some embodiments, a touch screen response to a user interaction may comprise a change in the display of the touch screen. A response may also include, for example, haptic feedback, audio feedback, and/or other types of responses.

One aspect of the invention relates to a method of measuring latency of display response of a touch screen on a touch screen based device, comprising recording, by a video camera, an interaction with the touch screen; correlating, by a processor in operative communication with the video camera, data retrieved from the recording to the interaction; and determining, by the processor, a latency of the response of the touch screen to the first contact. An interaction may comprise at least a first contact between a robotic member and the touch screen, and a response of the touch screen to the first contact including at least a first change of a frame of a display of the touch screen.

Another aspect of the invention relates to an exemplary video camera for measuring latency of display response of a touch screen on a touch screen based device. The video camera may include or interface with a recorder configured to record one or more interactions. An interaction may include at least a first touch between a robotic member and the touch screen, and a response of the touch screen to the first touch, the response including at least a first change of a frame of a display of the touch screen. The video camera may also include or interface with a processor in operative communication with the video camera. The processor may be configured to correlate data retrieved from the recording to an interaction, and determine a latency of the response of the touch screen to a first contact of the interaction.

Another aspect of the invention relates to an exemplary system for measuring latency of display response of a touch screen on a touch screen based device. The system may include a housing, a holder coupled to the housing, the holder configured to hold the touch screen based device in a fixed position, a robotic member coupled to the housing, the robotic member configured to effect one or more interactions with the touch screen based device; and a video camera coupled to the housing. The video camera may comprise a lens and a recorder, the lens being positioned such that it views the holder for the touch screen based device. The video camera may be configured to record an interaction with the touch screen. An interaction may include at least a first contact between the robotic member and the touch screen, and a response of the touch screen to the first contact including at least a first change of a frame of a display of the touch screen. A processor in operative communication with the video camera may be configured to correlate data retrieved from the recording to the interaction and determine a latency of the response of the touch screen to the first contact.

Another aspect of the invention relates to an exemplary method of measuring a response rate of a touch screen on a touch screen based device. The method may include recording, by a video camera, an interaction with the touch screen; correlating, by a processor in operative communication with the video camera, data retrieved from the recording to the interaction; and determining, by the processor, a frames-per-second rate of the response of the touch screen during a time period of the touch screen response to the first contact.

Another aspect of the invention relates to an exemplary video camera for measuring a response rate of a touch screen on a touch screen based device. The video camera may include or interface with a recorder configured to record one or more interactions. An interaction includes at least a first contact between a member and the touch screen, and a response of the touch screen to the first contact, the response including at least a first change of a frame of a display of the touch screen. The video camera may also include or interface with a processor in operative communication with the recorder. The processor may be configured to correlate data retrieved from recording to the interaction, and determine a frames-per-second rate of the response of the touch screen during a time period of the touch screen response to the first contact.

Another aspect of the invention relates to an exemplary system for measuring a response rate of a touch screen on a touch screen based device. The system may include a housing, a holder coupled to the housing, the holder configured to hold the touch screen based device in a fixed position, a robotic member coupled to the housing, the robotic member configured to effect one or more interactions with the touch screen based device; a video camera coupled to the housing, and a processor in operative communication with the video camera. The video camera may comprise a lens and a recorder, the lens being positioned such that it views the holder for the touch screen based device. The video camera may be configured to record an interaction with the touch screen. An interaction may include at least a first contact between the robotic member and the touch screen, and a response of the touch screen to the first contact including at least a first change of a frame of a display of the touch screen. The processor may be configured to correlate data retrieved from the recording to the interaction and determine a frames-per-second rate of the response of the touch screen to the first contact.

Other objects and advantages of the invention will be apparent to those skilled in the art based on the following drawings and detailed description.

DETAILED DESCRIPTION

Figure 1:
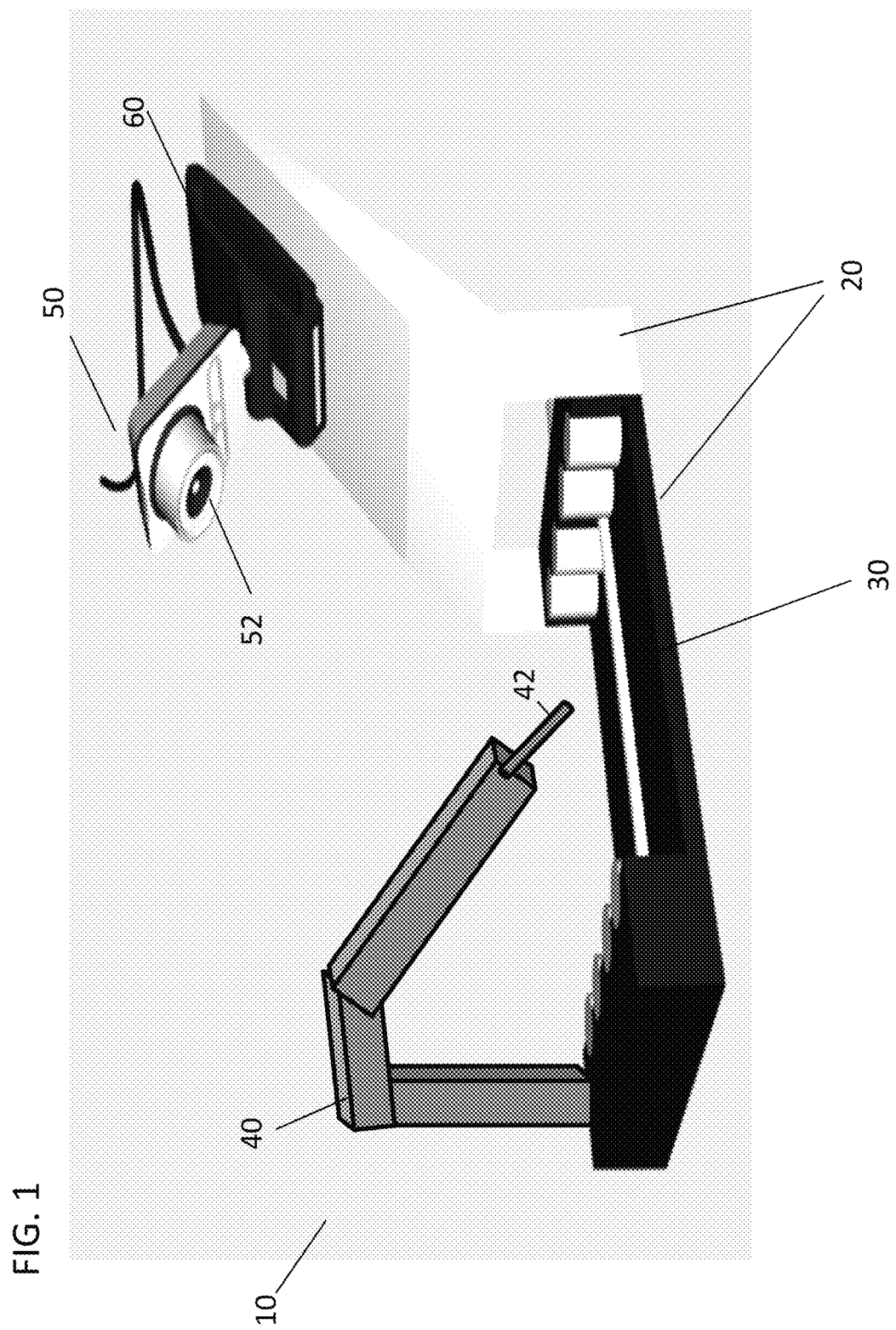
FIG. 1 illustrates a block diagram of an exemplary system, according to an aspect of the invention.

FIG. 1 illustrates a system 10 configured to determine a latency of response of a touch screen display on a touch screen device (not shown). System 10 may include a housing 20 with a holder 30, and a robot 40 operatively coupled to housing 20. Holder 30 may be configured to hold a touch screen device in a fixed manner. Holder 30 may hold touch screen devices of different sizes. For example, holder 30 may have fixable members or fasteners (not shown) that rigidly hold the touch screen device. The fixable members may include, for example, clamps that attach to the device, braces that hold the device at one or more of the device edges, adhesive at a top surface of the holder that attaches to a surface of the touch screen device opposite the touch screen display, or one or more combinations of these or other types of fixable members or fasteners.

Robot 40 may include a movable physical structure such as, for example, a robotic member 42, one or more sensors (not shown), one or more processors (not shown), and/or other robotic components. One or more of the processors of robot 40 may be used in an actuator (not shown) that may be used to enable robotic member 42 to move. In some embodiments, robotic member 42 may be a resistive or capacitive member. The actuator may be an actuator that is specific to robot 40 used in the system; in other embodiments, the actuator may be a conventional actuator. The actuator may include at least an electrical circuit and may be coupled to one or more of the processors of robot 40. The sensors of robot 40 may be disposed throughout robot 40. One or more of the sensors may be used to determine when a portion of robotic member 42 is in contact with another surface, such as a touch screen of a touch screen device. The sensors may also be able to communicate with the processors and the actuator of robot 40. For example, the sensors may sense that robotic member 40 is effecting a specific type of movement while in contact with a touch screen device, and may help enable that specific type of movement by communicating to the processor and the actuator measurements of the robotic arm, such as, for example, a position of robotic member 42 in relation to the processor, an amount of pressure that robotic member 42 is placing on the touch screen device, and an amount of time during which robotic member 42 is in physical contact with the touch screen device.

In some embodiments, robot 40 may be disposed separately from housing 20. In some embodiments, a part or component of robot 40 may be secured to housing 20. Robot 40 may communicate with other components coupled to housing 20 via wired or wireless data connections and/or through circuitry disposed in housing 20 and/or robot 40. In some embodiments, robot 40 may store any associated data including, for example, data obtained through robotic action, data regarding robot 40, or any other associated data, in a storage (not shown).

The storage may comprise electronic storage media that electronically stores information. An electronic storage media may include one or both of system storage that is provided integrally (e.g., substantially non-removable) to robot 40 and/or removable storage that is removably connectable to robot 40 via, for example, a port (e.g., a USB port, a firewire port, and/or other type of port) or a drive (e.g., a disk drive, and/or other type of drive). The storage may include one or more of optically readable storage media (e.g., optical disks, and/or other type of optically readable storage media), magnetically readable storage media (e.g., magnetic tape, magnetic hard drive, floppy drive, and/or other type of magnetically readable media), electrical charge-based storage media (e.g., EEPROM, RAM, and/or other electrical charge based-storage media), solid-state storage media (e.g., flash drive, and/or other type of solid-state storage media), and/or other electronically readable storage media. The storage may include one or more virtual storage resources (e.g., cloud storage, a virtual private network, and/or other virtual storage resources). The storage may store software algorithms, information determined by processor(s), and/or information received from components of robot 40 to function as described herein. The storage may also be accessible to one or more other system components including, for example, components coupled to housing 20.

A video camera 50 may also be coupled to housing 20. In some embodiments, video camera 50 may be mounted at a first end of housing 20, and holder 30 may be coupled to housing 20 at a second end of housing 20. Video camera 50 may include at least a lens 52 and at least one processor (not shown). In some embodiments, lens 52 may be positioned such that it points toward holder 30. For example, lens 52 may be positioned such that video camera 50 would capture an image of holder 30 when it records data. Video camera 50 may include circuitry, storage, and other conventional components that enable it to record, store and/or communicate video data. Video camera 50 may have a recording rate of at least 60 frames-per-second, although other recording rates may be used.

Video camera 50 may also include a sensor (not shown) that activates video camera 50 to record video. For example, the sensor may sense when a touch screen device is coupled to or disposed on holder 30. Video camera 50 may be controlled to record video whenever the sensor senses that a touch screen device is coupled to or disposed on holder 30. In some embodiments, the sensor may be coupled to video camera 50. The sensor may also be part of or coupled to holder 30. For example, the sensor may be disposed at a top surface of holder 30, such that it may be contacted when a touch screen device is coupled to or disposed on holder 30. The sensor may communicate data and/or signals regarding whether it senses a touch screen device coupled to or disposed on holder 30 to video camera 50 through wired or wireless communication, and/or through circuitry disposed in holder 30, housing 20, and/or video camera 50.

In some embodiments, video camera 50 may be activated by user input to record video and does not use a sensor to activate recording. For example, video camera 50 may have a user interface (not shown) that accepts user input. Alternatively, video camera 50 may receive signals and/or data from another device (e.g., a computer 60) that indicates that video camera 50 should begin recording. Computer 60 may be coupled to housing 20 or may be external to housing 20. Computer 60 may communicate with components of housing 20 (e.g., robot 40, video camera 50, and/or other components of housing 20) by wired or wireless communication and/or via circuitry disposed in housing 20, and/or one or more components coupled to housing 20.

In some embodiments, video camera 50 may use both sensors and user input to activate recording. For example, video camera 50 may begin recording based on sensor input, and may stop recording and then re-start recording based on user input. The recording may similarly be stopped, for example, when the touch screen device is no longer coupled to or disposed on the holder 30, by one of sensor input, user input, or both, in similar ways as to those described above.

Video camera 50 may be coupled to a processor of computer 60. Alternatively, computer 60 may be a component of video camera 50. In other embodiments, video camera 50 may be coupled to a plurality of processors, with one or more processors potentially coupled to housing 20, one or more other processors being a component of video camera 50, and/or one or more processors being a component of computer 60.

Computer 60 may be a conventional computer with at least a processor, a memory, and a user interface. Computer 60 may be any computing device such as, for example, a server, a desktop computer, laptop computer, personal digital assistant, smart phone, and/or any other computing device. Computer 60 may be capable of communicating with one or more components of housing 20. Computer 60 may also be capable of communicating with one or more storages coupled to or operably communicable with housing 20 and/or computer 60.

Processor(s), such as the processor described in conjunction with computer 60, may be configured to provide information processing capabilities. As such, processor(s) may include one or more of a digital processor, an analog processor, a digital circuit designed to process information, an analog circuit designed to process information, a state machine, and/or other mechanisms for electronically processing information. Although processor(s) may be described herein as a single entity, this is for illustrative purposes only. In some embodiments, processor(s) may include a plurality of processing units. These processing units may be physically located within the same device, or processor(s) may represent processing functionality of a plurality of devices operating in coordination.

Video camera 50 may be coupled to storage (not shown). In some embodiments, the storage may be the storage referenced above with regard to robot 40. The storage may be coupled to housing 20, in a remote location, or may be a component of video camera 50 or another component coupled to housing 20. In some embodiments, video camera 50 may store all of the data which it records to the storage. In some embodiments, video camera 50 may send only portions of the data which it records to the storage. Video camera 50 may additionally annotate the data that it stores in the storage. For example, video camera 50 may include metadata with the recordings that it stores in the storage. The metadata may include information such as, for example, beginning and end time of recording, length of recording, and other features or characteristics of the recording itself. In other examples, video camera 50 may store user-inputted data associated with a recording in the storage along with the associated recording.

In some embodiments, video camera 50 may include a user interface (as mentioned above) at which a user could enter user-inputted data related to the recording. Alternatively, a user may enter data into a device such as computer 60 above, which is in communication with video camera 50. For example, the data could include information such as type of touch screen device in the recording, types and times of movements of robotic member 42, and so forth. In some examples, a user interface may be disposed externally, with data communicated by wired or wireless communication to video camera 50 or to a storage with which video camera 50 communicates. In other examples, a user interface may be coupled to one of the other components coupled to housing 20 or may be a separate component coupled to housing 20. The user interface may also include storage, may be coupled to one or more existing storages already coupled to housing 20, or may communicate with a storage external to housing 20 which other components coupled to housing 20 may access. The user interface storage may also be one of the storages discussed above.

In other embodiments, a user may access a stored recording and may input data regarding the recording to be stored in the storage and associated with the recording. The user may access the stored recording and may input the data at an interface coupled to housing 20 or video camera 50, or via a device external to housing 20.

In some embodiments, video camera 50 may store both annotated and user-inputted data with a recording. When a user accesses the recording, the user may also have a choice to access annotated data and/or user-inputted data associated with or correlated to the recording. When analysis is performed on one or more recordings, the user may also be able to access the analysis and/or the results of the analysis for the respective recordings.

The foregoing description of FIG. 1 is exemplary and should not be viewed as limiting. Embodiments of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and embodiments of the invention, and performing certain actions. However, it will be apparent that such descriptions are merely for convenience and that such actions in fact result from computing devices, processors, controllers, or other devices executing the firmware, software, routines, or instructions.

Figure 2:
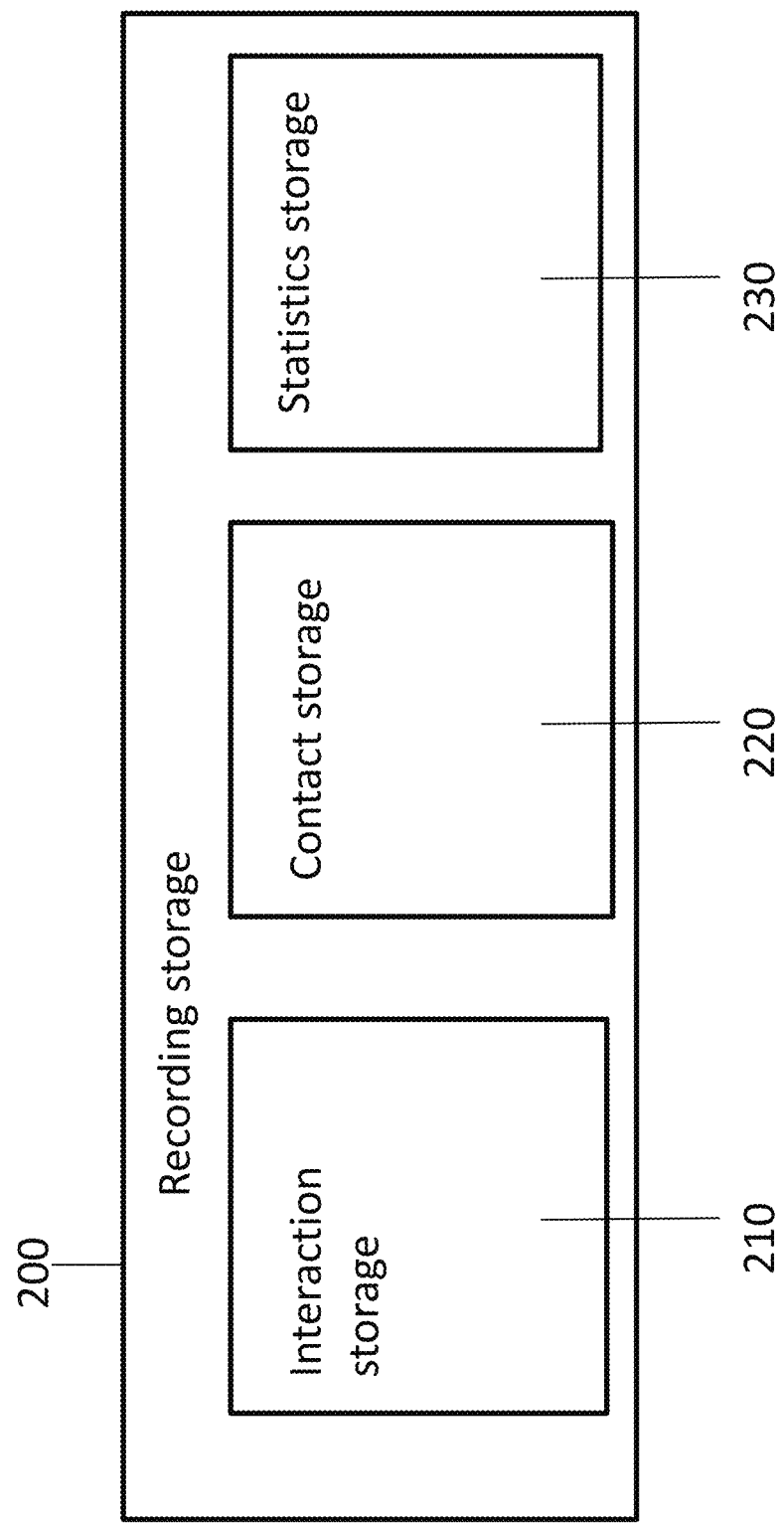
FIG. 2 illustrates an exemplary storage, according to an aspect of the invention.

FIG. 2 depicts an exemplary recording storage 200. In some embodiments, recording storage 200 may comprise one or more of the storages described above (e.g., the storage associated with robot 40, video camera 50, or any other system components). Recording storage 200 may comprise an interaction storage portion 210, a contact storage portion 220, a statistics storage portion 230, and/or other portions. These portions 210, 220, and 230 may include contiguous or overlapping portions of memory. Portions 210, 220, and 230 may or may not be separately allocated portions of memory within recording storage 200. In some embodiments, portions 210, 220, and 230 may be tables that are stored within the memory of recording storage 200, with entries in the tables referencing data stored within recording storage 200. In these embodiments, data stored in recording storage 200 may be shared or commonly referenced by one or more of the tables associated with portions 210, 220, and 230.

Recording storage 200 may comprise electronic storage media that electronically stores information. An electronic storage media of recording storage 200 may include one or both of system storage that is provided integrally (e.g., substantially non-removable) to housing 20 and/or removable storage that is removably connectable to housing 20 via, for example, a port (e.g., a USB port, a firewire port, and/or other types of ports) or a drive (e.g., a disk drive, and/or other types of drives). Recording storage 200 may include one or more of optically readable storage media (e.g., optical disks, and/or other types of optically readable storage media), magnetically readable storage media (e.g., magnetic tape, magnetic hard drive, floppy drive, and/or other types of magnetically readable storage media), electrical charge-based storage media (e.g., EEPROM, RAM, and/or other type of electrical charge-based storage media), solid-state storage media (e.g., flash drive, and/or other types of solid-state storage media), and/or other electronically readable storage media. Recording storage 200 may include one or more virtual storage resources (e.g., cloud storage, a virtual private network, and/or other virtual storage resources). Recording storage 200 may store software algorithms, information determined by processor(s), and/or information received from components of housing 20 to function as described herein.

Figure 3:
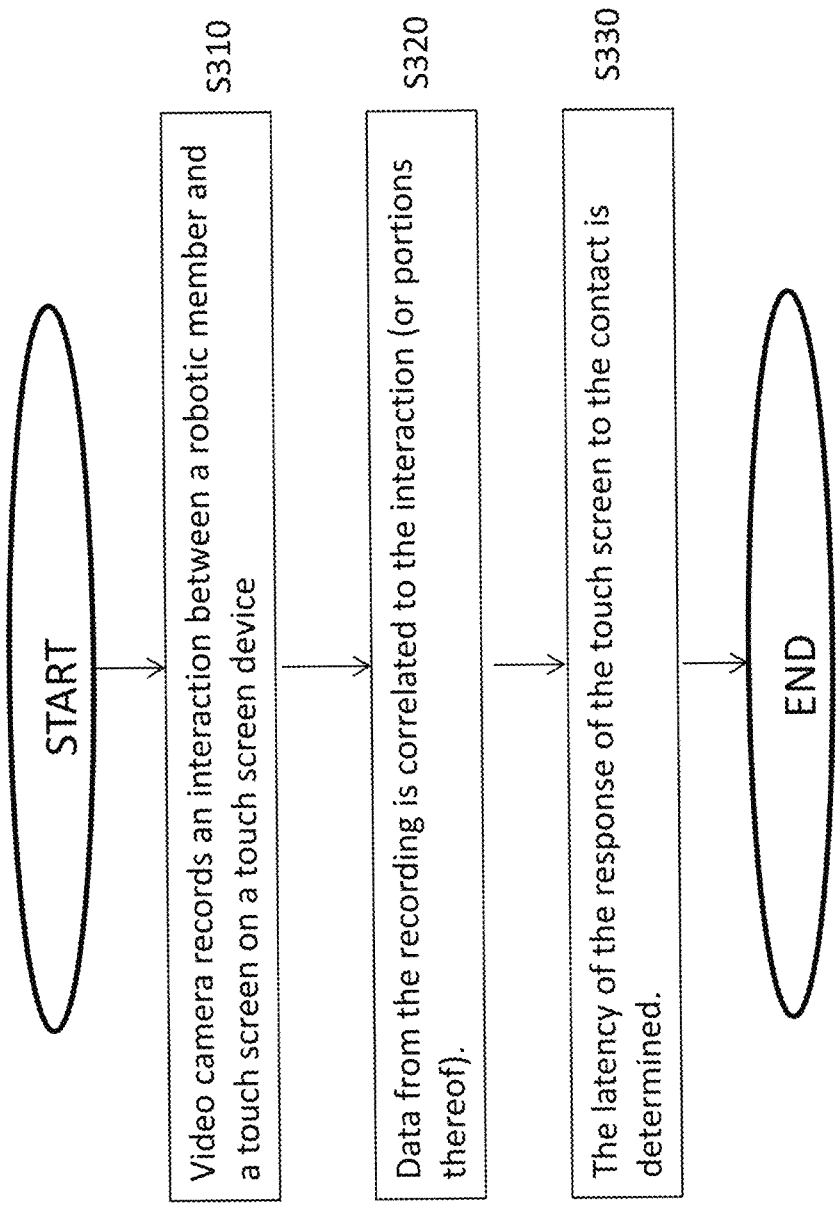
FIG. 3 illustrates a flowchart of an exemplary method of operating an exemplary system, according to an aspect of the invention.

FIG. 3 illustrates a flowchart of an exemplary method of measuring the latency of a display response of a touch screen on a touch screen device. The various processing operations depicted in the flowchart of FIG. 3 are described in greater detail herein. The described operations may be accomplished using some or all of the system components described in detail above and, in some embodiments, various operations may be performed in different sequences. In other embodiments, additional operations may be performed along with some or all of the operations shown in FIG. 3, while some operations may be omitted. In yet other embodiments, one or more operations may be performed simultaneously. Accordingly, the operations as illustrated (and described in greater detail below) are exemplary in nature and, as such, should not be viewed as limiting.

In operation 310, video camera 50 records an interaction between a robotic member and the touch screen of the touch screen device. An interaction includes at least a first contact between robotic member 42 and the touch screen, and at least the touch screen response, where the response may include at least a first frame change of the touch screen display. In an operation 320, the data from the recording may be correlated to the interaction (or portions thereof). In an operation 330, the latency of the response of the touch screen to the first contact may be determined.

In some embodiments, the interaction recorded by video camera 50 includes the entire recording (e.g., from when recording was activated to when recording was stopped). The recording could be activated by user input, by sensing a touch screen device in the holder, and/or by other actions that indicate that recording should be activated. The recording may be stopped by user input, by sensing that a touch screen device is no longer coupled to or disposed on holder 30, and/or by other actions that indicate that recording should be stopped.

In these embodiments, the interaction may include one or more contacts between robotic member 42 and the touch screen display, and a respective one or more responses of the touch screen display. For example, robot 40 may be programmed to initiate one or more specific types of contacts between robotic member 42 and the touch screen display in order to measure the response latency of the respective specific types of contacts. In another example, robot 40 may be programmed to initiate one or more specific types of contacts, and several of these programs may be run over the course of one interaction. In some embodiments, the interaction recorded by video camera 50 includes only one contact between robotic member 42 and the touch screen device (or only one program of contacts), and the respective response of the touch screen display (or respective responses). The programs of contacts may be stored in a storage coupled to or accessible by the robot 40. This storage may be one of the storages discussed above, or may be a separate storage either coupled to housing 20 or coupled to robot 40.

In some embodiments, a user may input specific contact(s) to robot 40 via, for example, a user interface such as computer 60, and robotic member 42 may carry out those specific contact(s) in one interaction. In some embodiments, a user may input specific program(s) to robot 40, for example, via a user interface such as computer 60, and robotic member 42 may carry out those specific programs in one interaction. A user may also select specific contacts or programs already stored at robot 40 or stored in a memory accessible by robot 40. A user may also input information regarding timing, a sequence of contacts or programs, timing between the completion of a response and the beginning of a contact, timing between programs, and other characteristics that are controllable by robot 40 when carrying out an interaction.

In some embodiments, a contact between robotic member 42 and the touch screen device includes at least an initial touch between robotic member 42 and the touch screen, and the completion of the contact. In some examples, the completion of the contact may be evidenced by a movement of robotic member 42 such that it is no longer in physical interaction with the touch screen display. In some examples, the completion of the contact may be evidenced by a movement of robotic member 42 such that it is no longer in physical interaction with the touch screen display for at least a predetermined amount of time. The predetermined amount of time may range from $\frac{1}{60}^{th}$ of a second to $\frac{1}{2}$ of a second, although any predetermined amount of time may be used. The predetermined amount of time may be determined by user input. It may also vary based on the response rate of the touch screen display or the mechanics of the robot 40 (e.g., how quickly robotic member 42 is able to move). In some embodiments, the contact may also include the entire physical interaction between robotic member 42 and the touch screen display between the initial touch and the completion of the contact.

Various types of contacts may be implemented. In some embodiments, the contact may be a swipe, a button push, pressure exerted on a specific part of the display, and/or another type of contact between robotic member 42 and the touch screen display. In some embodiments, the contact may comprise a movement of a robotic member 42 to be within any predetermined proximity of the touch screen device for any predetermined amount of time. For example, the proximity of the robotic member 42 to the touch screen display may be less than 5 mm. In some examples, it may range from 0.01 mm to 3 mm. The predetermined amount of time during which the robotic member 42 may be within the certain proximity to the touch screen device may be at least $\frac{1}{10}^{th}$ of a second. In some examples, it may range from $\frac{1}{30}^{th}$ of a second to 5 seconds. The proximities and/or times used are not limited to the examples described herein.

A program of contacts may include one or more scripted or preprogrammed contacts between robotic member 42 and the touch screen display. The one or more contacts may include contacts of different types (e.g., a swipe, a button press, another swipe, and/or other type of contact with a touch screen display). For example, a program of contacts may include a plurality of contacts of a first type (e.g., a swipe) and a plurality of contacts of a second type (e.g., button presses). In some examples, all of the contacts in the program may be of the same type. In another example, the contacts in the program may include one or more types of contacts, with some types of contacts repeated or each contact being of a type different from the other contacts in the program.

In some embodiments, a response of the touch screen display to the contact may include at least a first change of a frame of the touch screen display. A frame may be a unique image of the touch screen display. A frame may include a plurality of pixels. The number of pixels in a frame may depend on the size of the touch screen display and the display attributes (e.g., resolution, whether the display is a high-definition display, and/or other display attributes). The number of pixels in each frame may likely remain consistent with any image or graphics shown on the touch screen display. Digital display devices such as touch screen displays show unique consecutive frames to display graphics or to display responses to user input. In some embodiments, a response of the touch screen device may include, for example, haptic feedback, audio feedback, a change of a display of the touch screen, any combination thereof, and/or other types of responses.

When displaying a response to a contact, a touch screen display may display a plurality of frames, with each new frame being a change of frame from the previous frame. The first change of frame from the display at which the contact occurred may be the beginning of the response. In some embodiments, the completion of the response may be evidenced by no change in frame for a predetermined amount of time. The evidence for the completion of the response may depend on the frame rate (or frame frequency) of the touch screen device display. In some examples, the passage of time of one second with no frame change may be sufficient to evidence completion of the response. In other examples, half or a tenth of a second may be sufficient. In some examples, even less time (e.g., $\frac{1}{30}^{th}$ to $\frac{1}{10}^{th}$ of a second) is sufficient. The amount of time that is sufficient to evidence completion of the response is not limited to the examples described herein.

As part of operation 320, the interaction recorded by video camera 50 may be stored in a recording storage such as, for example, recording storage 200. As mentioned above, recording storage 200 may be coupled to video camera 50, coupled to housing 20, or may be external to housing 20. In some embodiments, recording storage 200 resides in computer 60. Recording storage 200 may also be one of the other storages discussed above. Data comprising the interaction may be in one or more suitable formats including for example, mpeg, jpeg, xvid, H.264, png, raw video, images, and/or other formats. Other information, such as metadata or user-inputted information, may be stored in recording storage 200 in correlation with a respective interaction. In addition to the examples provided above, other examples of data stored in correlation with a respective interaction may include: one or more contact(s) in the interaction, a sequence of contacts in the interaction, types of contacts in the interaction, time between contact(s) in the interaction (e.g., time after completion of a response to the beginning of the next contact), when the interaction includes more than one contact, and/or other data related to the interaction. For example, when robot 40 is programmed to enable a series of contacts in one interaction, that series of contacts, along with timing and type of contact when available, may be stored with the respective interaction.

In some embodiments, when an interaction does not include a contact (e.g., it does not include at least an initial touch between robotic member 42 and the touch screen, and at least the completion of the contact), the interaction may not be stored in recording storage 200. In other examples, the interaction may be stored along with data annotating that the interaction does not include a contact. When the interaction includes a plurality of contacts, with at least one contact that was not completed, the interaction may be stored but may be annotated with data indicating that one or more contacts in the interaction are not complete. In other examples, the interaction may be stored with data specifying which contact was not completed.

Similarly, in some interactions, when an interaction does not include a response (e.g., it does not include at least a first change of frame of the touch screen display and a completion of the response on the touch screen response), similar actions may be taken and similar data may be stored in correlation with the interaction. In some embodiments, the first change of frame may be the first noticeable frame change of the display. For example, the first frame change may not be a noticeable frame change of the display. A plurality of frame changes may be needed before a noticeable frame change is detected.

In some embodiments, a first noticeable frame change may be detected by comparing the RGB (Red, Green, Blue) values of each pixel of a frame, with the RGB values of the same pixel in the previous frame and/or the first frame after the contact was completed. For example, each pixel in a frame may have a corresponding Red value, Green value, and Blue value. The Red value, Green value, and Blue value may each range from 0 to 255. When a Red value of a pixel is 0, that may indicate that the pixel does not include any red color. When a Red value of a pixel is 255, that may indicate that the pixel includes all of the red color that is available for display. Green and Blue values for a pixel may be similarly construed.

A noticeable frame change may be determined by a high difference in RGB values of the pixels of the frame. For example, when frame "n" is completely black, each individual pixel may have a RGB value of 0, 0, 0. When a next frame "n+1" is completely white, each individual pixel may have an RGB value of 255, 255 255. This frame change may be noticeable, as the RGB values of the pixels of the frame may have changed by a theoretical maximum amount. In some embodiments, only a 50% change in RGB values of the pixels of a frame may be needed to indicate a noticeable frame change. In some embodiments, only a change in RGB value of one pixel of a frame may be needed to indicate a noticeable frame change. In some embodiments, a change in RGB value of the pixels of a frame may range from 10% to 90% to indicate a noticeable frame change. An amount of frame change that is sufficient to show a noticeable frame change is not limited to the examples described herein.

When video camera 50 stops recording without reliance on specific user or sensory input (e.g., the camera unexpectedly stops recording), then the interaction recorded may be stored with data annotating that an unexpected stop in recording occurred. Other similar unexpected situations (e.g., the touch screen device is removed from the holder while it is in contact with the robotic member 42, the robotic member 42 remains in contact with the touch screen device for a prolonged and unusually long period of time, and/or other unexpected situations) may be annotated in a like manner.

In some embodiments, one or more recording processors may be coupled with recording storage 200. The recording processor may be a processor described above in relation to video camera 50. It may also be a processor described above in relation to computer 60. The recording processor may also be one of several other processors discussed above, or may be a separate processor that is coupled to the recording storage to enable analysis of the data stored therein. The recording processor may be configured to view and analyze interaction data stored in the recording storage and include annotations or meta data with the interaction regarding the types of contact(s), sequences of contact(s), length of contact(s) and so forth.

In some embodiments, the recording processor may analyze the interactions stored in recording storage 200 and separately store or reference one or more contacts that occur in the interactions that are stored in the recording storage. For example, the recording processor may store a set of a contact and a response that occurs in an interaction stored in recording storage 200 in another portion (e.g., contact storage portion 220) of recording storage 200. Metadata associated with the interaction may be stored with each set of contact and response. Metadata related to a specific set of contact and response may be stored in association or in conjunction with the respective set of contact and response.

Figure 4:
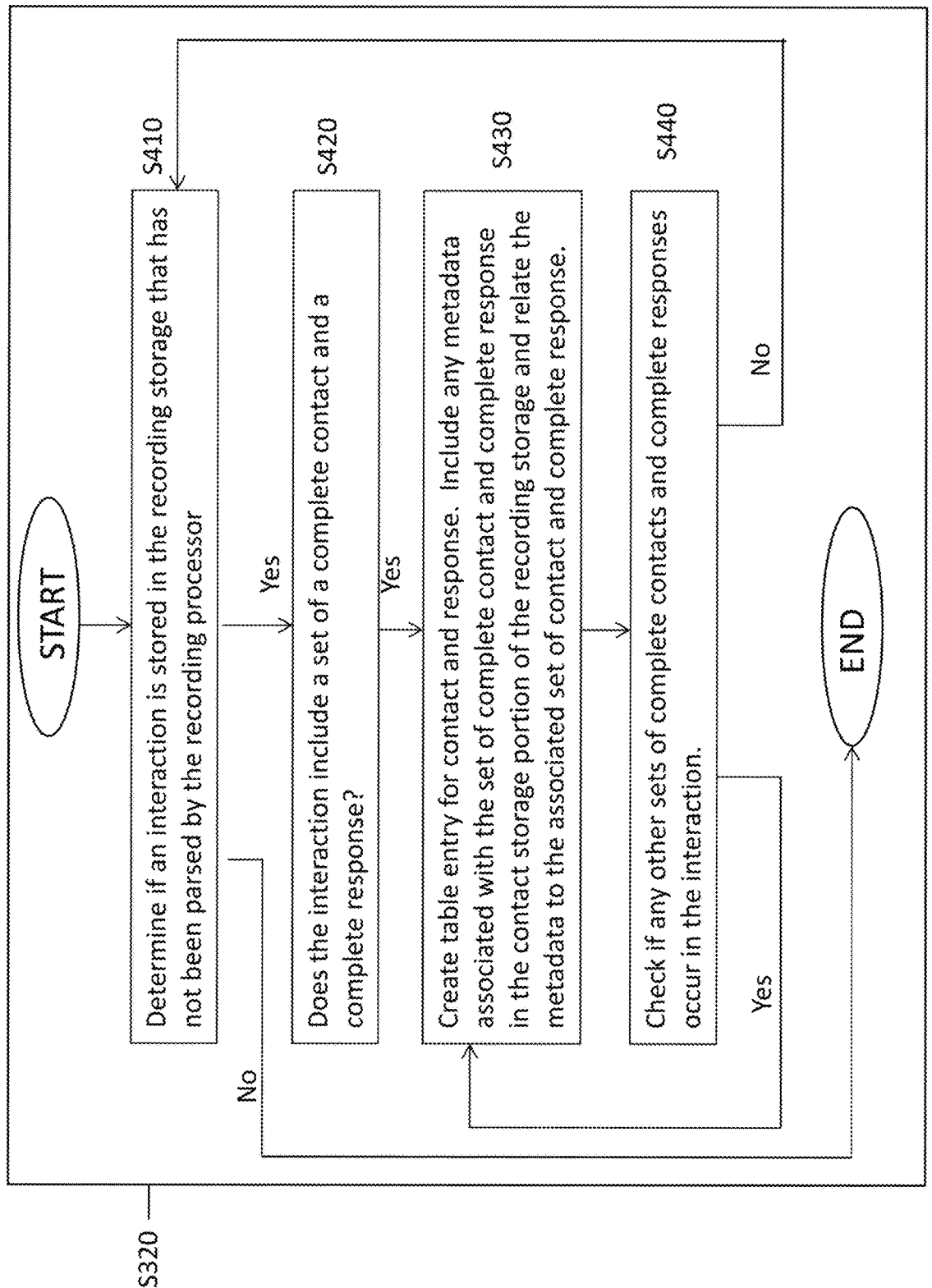
FIG. 4 illustrates an exemplary method of parsing interaction data, according to an aspect of the invention.

FIG. 4 depicts an exemplary method of the correlation of operation 320 performed by the recording processor, for storing individual sets of contact and response from the one or more interactions stored in recording storage 200. The various processing operations depicted in the flowchart of FIG. 4 are described in greater detail herein. The described operations may be accomplished using some or all of the system components described in detail above and, in some embodiments, various operations may be performed in different sequences. In other embodiments, additional operations may be performed along with some or all of the operations shown in FIG. 4, while some operations may be omitted. In yet other embodiments, one or more operations may be performed simultaneously. Accordingly, the operations as illustrated (and described in greater detail below) are exemplary in nature and, as such, should not be viewed as limiting.

In some embodiments, this exemplary method may be triggered whenever a new interaction is stored in recording storage 200 (or in interaction storage portion 210). In some embodiments, this exemplary method may be performed routinely. For example, the method may be performed every time the system is used or at predetermined or user-input time intervals. In this example method, an interaction may be represented in an interaction storage table in interaction storage portion 210. The interaction table entry may refer to a storage area (e.g., an address or set of addresses) at which the interaction data is stored. A set of contact and response similarly may be represented by an entry in a contact storage table in contact storage portion 220. The contact storage table entry may refer to an interaction entry and may also refer to a storage area (e.g., an address or set of addresses) at which the set of contact and response data is stored. In some embodiments, the storage area of the set of contact and response data may be a subset of the storage area of the interaction data.

In operation 410, the recording processor determines whether there are any interactions that have not yet been parsed. For example, when an interaction entry does not include any references to one or more entries in the contact storage table, then the interaction may not yet have been parsed. For those interactions without reference to an entry in the contact storage table, the recording processor may next determine whether the annotated data includes any indication that the entry is deficient. When the recording processor determines that the entry is deficient, the recording processor may delete the interaction entry and any corresponding data. When the recording processor determines that the entry is not deficient, the recording processor may proceed to operation 420.

In operation 420, the processor may determine whether the interaction includes a set of a complete contact and a complete response. For example, the processor may analyze annotated data associated with the interaction or may analyze the interaction to determine when a complete contact and complete corresponding response occurs. The processor may also analyze the interaction data to determine whether a complete set of a contact and a corresponding response has occurred. In some embodiments, the processor may receive user input indicating that a complete set of contact and response exists. In these embodiments, the processor may further receive user input demarcating data corresponding to a complete set of a contact and a response.

When a determination is made in operation 420 that the interaction includes a set of a complete contact and a complete response, the processor may then, in operation 430, create an entry in the contact storage table referring to the complete contact and corresponding response. In some embodiments, the entry may refer to the data associated with the contact and response in a contact storage table entry. In some embodiments, the recording processor may copy data including the contact and response (or in some cases, only data including the contact and response) to a new storage area and associate the table entry with the copied data. The table entry may also refer to the interaction table entry. The table entry may also include metadata related to the contact and response. In some examples, the table entry may also include response latency data and/or metadata or annotated data associated with the interaction.

In operation 440, the recording processor may determine whether there is another set of complete contact and response that occurs in the interaction. For example, the recording processor may determine whether there is any data in the interaction after the previously considered set of contact and response. When a determination is made in operation 440 that the interaction includes another set of a complete contact and a complete response, then the recording processor may undertake the processing involved with operation 430 for the next complete set of contact and response. The recording processor undertakes the processing involved with operation 430 for each set of complete contact and response that occurs in the interaction. When the processor determines that another set of complete contact and response does not occur in the interaction in operation 440, the processor returns to operation 410. When all of the interactions stored in recording storage 200 (or in interaction storage 210) have been parsed, then the exemplary method may end (or may wait for another interaction to be stored, which may again trigger the method).

In operation 330, the latency of the response of the touch screen to the first contact is determined.

As part of operation 330, the recording processor may be configured to determine a latency of the touch screen response to a contact on the touch screen display. In some embodiments, the recording process may access interaction data stored in recording storage 200, for example, in interaction storage portion 210. When the interaction data has not been parsed, the interaction data may undergo a method similar to the parsing method described above with reference to FIG. 4.

In some embodiments, the recording process may calculate a latency of touch screen response for one or more contacts in the interaction. For example, for the first contact in the interaction, the recording processor may determine a length of time of the touch screen response. In another example, user input may be received regarding the length of time. The length of time of the touch screen response may be the latency of the touch screen response for that contact. The recording processor may store the determined latency in association with the interaction (e.g., as part of the interaction's table entry in interaction storage portion 210) and may also store the determined latency in association with the specific contact and response set in contact storage portion 220 (as part of the respective contact and response entry).

The recording processor may also store the determined latency in association with the type of contact. For example, recording storage 200 may store the determined latency in association with the type of contact in statistics storage portion 230, in which the recording processor stores determined latencies for each type of contact that occurred in the interactions stored in recording storage 200 (or interactions storage portion 210). Statistics storage 230 may also include and update the number of times latency for a specific type of contact (and for example, a specific type of contact completed on a specific type of device) has been determined. In some embodiments, the recording processor may determine an aggregate or amortized latency for a specific type of contact by accessing statistics storage portion 230 for information regarding previously determined latencies for that specific type of contact.

The recording processor may also be configured to view interaction data stored in interaction storage portion 210 of recording storage 200 and include annotations or meta data with the interaction regarding, for example, the time or length of the response, the number of frame changes in the response, the number of unique frames in the response, the time it took for each frame change, and/or other information relating to the interaction. The recording processor may also store that information in statistics storage portion 230, and may store relevant parts of the annotations or meta data with sets of contacts and responses in contact storage portion 220.

The recording processor may also determine a frames per second response rate of the touch screen device. For example, the recording processor may use information stored in recording storage 200 to determine a frames per second response rate of the touch screen device. In some embodiments, the recording processor may be able to determine when a frame change occurs. For example, the recording processor may analyze the pixels recorded from the display and determine when individual pixels on the display are different (indicating a frame change).

With some display screens, or in some examples, more than one pixel may need to be different to indicate a frame change. The number of pixels that need to change in order to indicate a frame change may vary based on touch screen display type, type of graphics being rendered, speed of graphics being rendered, quality of data, and so forth. In some examples, the number of pixels needed to indicate a frame change may be artificially decided (e.g., not based on the device or any characteristics of the device or the graphic being displayed). For example, the number of pixels needed may be a number that only encompasses frame changes that change a significant portion of the frame. In other examples, the number of pixels needed may encompass a number of pixels that indicates at least $1/100$ of the frame is changed. In some instances, less than $1/100^{th}$ of the frame is changed, for example, $1/200$, $1/500$, or even $1/1000$. Even smaller amounts of the frame being changed may be artificially imposed as the number of pixels needed to indicate a frame change. Alternatively, larger amounts may also be considered, for example, $1/50$, $1/10$, and so forth. The number of pixels that are sufficient to indicate a frame change is not limited to the examples described herein.

The recording processor may also determine an amount of time taken for each frame change. The recording processor may use that information to determine an objective frames-per-second rate for graphics displayed by the touch screen device.

The recording processor may also store all of the information that it determines, the information that is configured to view or analyze, or any output thereof, in recording storage 200 and/or relevant portions 210, 220, 230 thereof. The recording processor may access stored data in recording storage 200 to perform analysis at a later date. The recording processor may also access data in recording storage 200 while doing concurrent analysis to determine aggregate or amortized rates or results or while performing other types of analysis.

Figure 5:
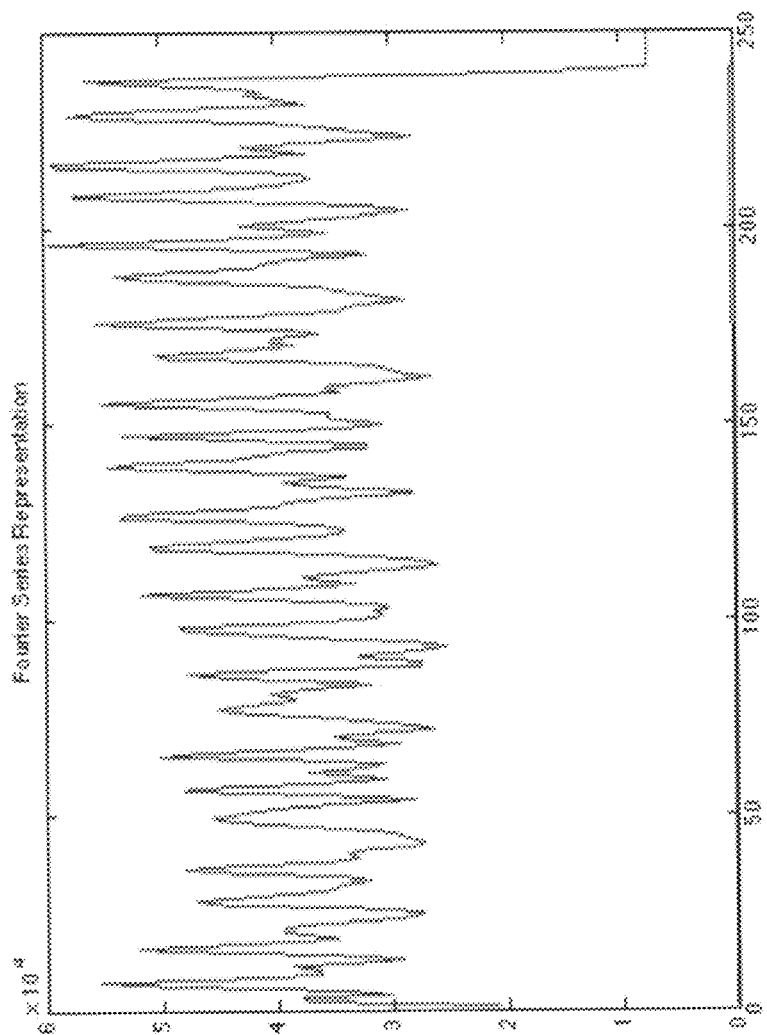
FIG. 5 illustrates an exemplary graph representing characteristics of interactions, according to an aspect of the invention.

The recording processor may be configured to perform analyses on the stored data. For example, the recording processor may access stored data to determine a consistency of frame rate in the touch screen device. In another example, the recording processor may conduct a Fourier analysis on the rate change data. In some examples, the recording processor may be configured to create and/or output a Fourier Series Representation of the frames-per-second rate of the touch screen display. FIG. 5 shows one example of a Fourier Series Representation based on analysis from an exemplary recording processor.

In some embodiments, the data regarding frame change rate, timing for frame changes, and so forth, may be correlated with the interaction data. For example, the recording processor may access stored data to determine a consistency of frame rate in the touch screen device in response to certain types of contact (e.g., swipes, button presses, and/or other types of contacts). In other examples, the recording processor may determine a consistency of frame rate in response to the timing of contact (e.g., how quickly a second contact is begun after the completion of a touch screen response to a first contact). In other examples, the recording processor may determine whether there is a difference in touch screen response time depending on patterns in an interaction, such as, for example, a number of contacts previously completed in a certain time period, a repetition of a certain type of contact, and/or other patterns. In some embodiments, robot 40 may store programs that include patterns such as repeating contacts or performing a sequence of different types of contacts in a timed manner such that the processor is able to obtain corresponding information regarding a touch screen response to respective patterns.

In some embodiments, the recording processor may prepare reports detailing, for example, statistics related to specific touch screen devices (e.g., latencies of specific types of contacts for a specific touch screen device), latencies of display rate response of various touch screen devices in response to a specific type of contact, and/or other statistics related to specific touch screen devices. For example, a device manufacturer may submit a device for testing. In this example, the device manufacturer may receive a report prepared by the recording processor that details the device's display rate latencies for various types of contact. In another example, a programmer may submit an application for testing across various devices. In this example, the application programmer may receive a report prepared by the recording processor detailing the display rate latencies of the various devices for one or more of the interactions that may be required and/or potentially completed with the application.

Aspects and embodiments described herein as including a particular feature, structure, or characteristic, but every aspect or embodiment may not necessarily include the particular feature, structure, or characteristic. Further, when a particular feature, structure, or characteristic is described in connection with an aspect or embodiment, it will be understood that such feature, structure, or characteristic may be included in connection with other aspects or embodiments, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method of measuring latency related to touch screen response, the method comprising:
monitoring, by one or more processors, frame change rates of a touch screen of a device;
determining, by one or more processors, based on the monitored frame change rates of the touch screen, a response end time of a response depicted on the touch screen, the touch-screen-depicted response being a response to a physical contact with the touch screen; and
determining, by one or more processors, a latency of the touch screen response to the physical contact based on a contact time of the physical contact and the response end time.

2. The method of claim 1, further comprising:
causing, by one or more processors, a robotic member to move to perform the physical contact with the touch screen.

3. The method of claim 1, further comprising:
generating, by a camera, a video of an interaction with the touch screen of the device, wherein the interaction comprises (i) the physical contact with the touch screen and (ii) the touch-screen-depicted response of the touch screen to the physical contact; and
determining the contact time of the physical contact based on the interaction video,
wherein monitoring the frame change rates comprises monitoring the frame change rates of the touch screen based on the interaction video.

4. The method of claim 3, wherein the camera has a recording rate of at least a 60 frames-per-second.

5. The method of claim 3, wherein the interaction comprises a plurality of contacts between a member and the touch screen, the plurality of contacts comprises the physical contact of a first type of contact and a second physical contact of a second type of contact different from the first type of contact, and at least one of the plurality of contacts comprises:
an initial contact between the member and the touch screen; and
a completion of the initial contact between the member and the touch screen.

6. The method of claim 5, wherein at least one of the first or second types of contact comprises a touch, a swipe, or a button press.

7. The method of claim 5, further comprising:
determining, by one or more processors, a first average latency of response of the touch screen to the first type of contact; and
determining, by one or more processors, a second average latency of response of the touch screen to the second type of contact.

8. The method of claim 1, wherein the touch-screen-depicted response to the physical contact comprises:
an initial response of the touch screen comprising a first change of frame of the touch screen that occurs at a beginning of the touch-screen-depicted response; and
a completion of the touch-screen-depicted response comprising at least a plurality of frame changes.

9. The method of claim 1, wherein determining the response end time comprises determining, based on the monitored frame change rates, the response end time to be a time at which no frame change subsequently occurs for at least a predetermined amount of time.

10. The method of claim 1, further comprising:
determining, by one or more processors, a change in a number of pixels of the touch screen;
obtaining, by one or more processors, one or more characteristics of the touch screen being tested;
determining, by one or more processors, whether the change in the number of pixels is sufficient to determine that the touch screen has responded to the physical contact based on the one or more characteristics of the touch screen; and
determining, by one or more processors, the response end time based on the monitored frame change rates of the touch screen and the determination of whether the change in the number of pixels is sufficient.

11. The method of claim 1, further comprising:
obtaining, by one or more processors, information specifying latencies of responses of the touch screen to contacts, the touch screen responses comprising the touch-screen-depicted response and the contacts comprising the physical contact;
determining, by one or more processors, respective amounts of time between contact times at which at least some of the contacts occurred and end times of the touch screen responses to other ones of the contacts, wherein the other ones of the contacts immediately preceded respective ones of the at least some contacts; and determining, by one or more processors, latency patterns of the touch screen based on the respective amounts of time and the latencies of the touch screen responses to the at least some contacts.

12. A system comprising:

a computer system comprising one or more processors programmed with computer program instructions that, when executed by the one or more processors, cause the computer system to:

monitor frame change rates of a touch screen of a device;

determine, based on the monitored frame change rates of the touch screen, a response end time of a response depicted on the touch screen, the touch-screen-depicted response being a response to a physical contact with the touch screen; and determine a latency of the touch screen response to the physical contact based on a contact time of the physical contact and the response end time.

13. The system of claim 12, wherein the computer system is caused to:

cause a robotic member to move to perform the physical contact with the touch screen.

14. The system of claim 12, wherein the computer system is caused to:

cause a camera to record a video of an interaction with the touch screen of the device, wherein the interaction comprises (i) the physical contact with the touch screen and (ii) the touch-screen-depicted response of the touch screen to the physical contact; and determining the contact time of the physical contact based on the interaction video, wherein monitoring the frame change rates comprises monitoring the frame change rates of the touch screen based on the interaction video.

15. The system of claim 14, wherein the camera has a recording rate of at least a 60 frames-per-second.

16. The system of claim 12, wherein determining the response end time comprises determining, based on the monitored frame change rates, the response end time to be a time at which no frame change subsequently occurs for at least a predetermined amount of time.

17. The system of claim 12, wherein the computer system is caused to:

determine a change in a number of pixels of the touch screen;

obtain one or more characteristics of the touch screen being tested;

determine whether the change in the number of pixels is sufficient to determine that the touch screen has responded to the physical contact based on the one or more characteristics of the touch screen; and determine the response end time based on the monitored frame change rates of the touch screen and the determination of whether the change in the number of pixels is sufficient.

18. One or more non-transitory computer-readable storage media comprising instructions that, when executed by one or more processors, perform operations comprising:

monitoring frame change rates of a touch screen of a device;

determining, based on the monitored frame change rates of the touch screen, a response end time of a response depicted on the touch screen, the touch-screen-depicted response being a response to a physical contact with the touch screen; and determining a latency of the touch screen response to the physical contact based on a contact time of the physical contact and the response end time.

19. The one or more non-transitory computer-readable storage media of claim 18, the operations further comprising:

causing a robotic member to move to perform the physical contact with the touch screen.

20. The one or more non-transitory computer-readable storage media of claim 18, the operations further comprising:

causing a camera to record a video of an interaction with the touch screen of the device, wherein the interaction comprises (i) the physical contact with the touch screen and (ii) the touch-screen-depicted response of the touch screen to the physical contact; and determining the contact time of the physical contact based on the interaction video, wherein monitoring the frame change rates comprises monitoring the frame change rates of the touch screen based on the interaction video.

* * * * *